Inventors:
WALDEMAR LINDEMANN
FRITZ VAN ENDERT

Aug. 21, 1962  W. LINDEMANN ETAL  3,049,988
SCRAP SHEARING MACHINE
Filed March 18, 1957  5 Sheets-Sheet 4

Inventors:
WALDEMAR LINDEMANN
FRITZ VAN ENDERT
BY Cleveland B. Hillsbrugh
ATTORNEY Aug. 21, 1962 W. LINDEMANN ETAL 3,049,988
SCRAP SHEARING MACHINE
Filed March 18, 1957 5 Sheets-Sheet 5

Fig. 8

Inventors:
WALDEMAR LINDEMANN
FRITZ VAN ENDERT
BY Cleveland B. Hollabaugh
ATTORNEY United States Patent Office 3,049,988
Patented Aug. 21, 1962

3,049,988
SCRAP SHEARING MACHINE
Waldemar Lindemann, Dusseldorf, and Fritz van Endert, Dusseldorf, Oberkassel, Germany; said Van Endert assignor to said Lindemann
Filed Mar. 18, 1957, Ser. No. 646,827
Claims priority, application Germany Apr. 20, 1956
18 Claims. (Cl. 100—95)

This invention relates to a scrap shearing machine and more particularly to a scrap shearing machine which is capable of breaking up scrap metal which has not been sorted according to the size and structure of the individual pieces.

A variety of different machines has been developed for breaking up different types of scrap metal. The individual machines which have heretofore been available are adapted to cut only one type of scrap. For this reason, it has been necessary to thoroughly sort the scrap according to the size and structure of the individual pieces and then cut up each type by the use of a shearing machine adapted to handle that particular type. The sorting of scrap metal is very expensive and time-consuming but could not hitherto be avoided, because there have been no shearing machines in existence which were capable of cutting un-sorted scrap metals.

Now, it is an object of this invention to provide a scrap shearing machine which is able to cut up scrap metal which has not been sorted.

A further object is to provide a scrap shearing machine which is adapted to receive scrap metal which has not been sorted on a substantially continuous basis, to compress and shear it into bales which are ready for re-melting in the production of iron and steel products.

Another object of this invention is to provide a scrap shearing machine which is adapted to compress and to cut scrap metal which has not been sorted into bales of any desired length and then cut the lengths of compressed scrap metal in a direction at right angles to the first cuts.

Other objects of this invention and its various advantageous features will become apparent from the detailed description of this invention which follows.

The scrap shearing machine in accordance with this invention comprises essentially the combination of a plurality of plungers positioned side-by-side which operate independently on a substantially vertical axis and are adapted to compress scrap metal into a compact mat, a means for shearing a compressed mat of scrap metal positioned adjacent the said plungers, and a means for feeding scrap metal into positions in which it is compressed by the said plungers and then sheared into bales by the said shearing means.

The plungers of this shearing machine are adapted to be lowered onto scrap metal positioned beneath them with considerable force and each of them is separately driven so that each compresses the material beneath it to an extent which depends on the force exerted by the plunger and the resistance of the scrap beneath it which opposes this force. In this way the region in front of the shears is sub-divided into as many sections as there are individual plungers and the compression of the scrap under each plunger takes place almost independently of what occurs under the other plungers. Thus, if pieces of scrap which offer great resistance are, for example, under one of the plungers, so that this plunger is only lowered to a relatively small extent, this has no effect on the adjacent plungers under which the pieces of scrap may possibly be relatively yielding, so that the plungers have to be lowered to a relatively great extent in order to bring the scrap into the desired compact form.

When the scrap has been brought into the form of a compact, coherent mat by the action of the individual plungers, the plungers are raised, and the compacted scrap is moved into the cutting zone by the feeding means and is cut by the shears of the machine. At the same time, the compacted scrap is moved into the cutting zone, loose scrap is moved forwardly into the compression zone below the plungers.

Hydraulic drives are provided for both the plungers and the shearing knife, since a mechanical drive having the necessarily large stroke could not exert the great pressure required by both the plungers and the shearing knife and would not allow the plungers to adjust themselves separately when compressing the scrap. The hydraulic drive of the plungers is preferably so constructed that each plunger itself constitutes a hydraulic pressure cylinder. The use of this type of construction offers the advantage of removing the place at which the piston rod emerges from the cylinder of the plunger at a distance from the scrap metal being compressed and thereby reduces the possibility of damage to its hydraulic mechanism by small pieces of scrap.

A plate is preferably fitted before the plungers to protect them, when in their raised position, from scrap which is heaped up in front of the compression zone, to be fed forwardly into this zone. The lower edge of this plate is desirably provided with a forwardly inclined surface to facilitate the movement of the scrap into the compression zone under the plungers. The fixed sides of the compression zone are also, desirably, angled outwardly in the direction of movement of the compressed scrap to facilitate its movement into the position in which it is cut.

The shearing means of this machine consists of a fixed blade or knife and a cooperating, moveable blade or knife which can be raised and lowered. The moveable blade is raised by single acting hydraulic cylinders and lowered for cutting by single acting hydraulic cylinders having a larger effective area than those which raise the blade. The moveable blade preferably has the shape of an inverted V to facilitate its cutting action and to counteract any tendency for the scrap to move laterally and outwardly. The surface directly adjacent the lower, fixed blade on which the compressed scrap rests is preferably grooved to prevent lateral movement of the scrap either inwardly or outwardly.

The total stroke of the moveable shearing knife or blade and that of the plungers may be made adjustable in order to increase the efficiency of the machine by raising them only the distance required by the heap of scrap being fed to them. In this way both time and driving energy may be economized when working on a small heap of scrap.

The drive for the moveable blade of the shears is provided with a control which allows any shock occurring at the end of each cut due to the resistance to cutting being suddenly reduced to zero to be absorbed. This control is obtained by maintaining hydraulic cylinders which raise the moveable knife under pressure while it is lowered during the cutting operation by its downwardly acting hydraulic cylinders. The back-pressure provided by the cylinders which raise the knife prevents excessively high acceleration of the knife when the cutting resistance of the scrap metal disappears and the knife moves into its end position.

In operating this shearing machine, the compression and cutting operations may be carried out at different times. Preferably, however, the plungers and the shearing knife are lowered simultaneously in such a manner that the knife cuts a part of the scrap which has been compressed in a preceding pressing operation, while the plungers simultaneously compress a part of the scrap which is to be cut in the next shearing operation. When operating in this manner, the plungers tend to hold the scrap which is being cut and thereby facilitate the cutting operation.

The moveable shearing knife and the plungers can be allowed to move downwardly until they come to rest on the scrap under gravity, and thereby reduce the driving power required. Then, after they come into contact with the scrap, the actual drive can be started. Further, in order to economize on the power required, two pressure stages are, desirably, provided for the cutting knife by including a pressure converter in its hydraulic system. The lower stage supplied directly from a hydraulic pump is first used and, then, if the pressure is insufficient to make the cut, the higher pressure stage from the pressure converter is used.

This machine is provided with a feed trough positioned in front of the plungers which has a feed platen which is moveable to feed scrap by successive steps into the compression zone and then on into cutting position. The feed platen is moved, for example, by a double acting hydraulic cylinder. Both the total stroke and the partial stroke of the feed platen are preferably adjustable. The adjustability of the total stroke enables time and power to be economized when the trough is not fully charged. The adjustability of the partial stroke enables the machine to be better adapted to suit the kind of scrap being treated at any particular time.

This machine is also desirably provided with another trough which is adapted to receive scrap metal on a substantially continuous basis. A tip-trough located beside the feed trough is convenient for this purpose. This trough can receive scrap metal continuously, except during the brief time intervals when it is tipped to dump a load of scrap metal into the feed trough at a time when the feed platen in the feed trough is in its retracted position.

The shearing machine in accordance with this invention can vary widely in dimensions. The maximum dimension of the bale or package of scrap metal which is produced by the machine is, as a practical matter, determined by its width across the direction of travel of the scrap metal through the machine. An efficient size is relatively large and produces bales or packages of scrap metal which are suitable for feeding, for example, to a Siemens-Martin furnace, but which are too large for feeding to an electric furnace.

A further feature of this invention is the provision of mechanism for cutting relatively long bales of scrap metal substantially at right angles to the plane of the first cut in a highly efficient manner. This mechanism is adapted for the cutting of bales too large, for example, for feeding to an electric furnace, into smaller bales. It includes a conveyor positioned after the first shears so that it runs parallel to the cut of the shears and so that bales of scrap metal cut by the shears fall or slide directly onto it. A second shearing device, which may be considerably smaller in width than the first shears, is positioned at one end of this conveyor to receive and cut the long bales of scrap metal carried to it by the conveyor. A shaking or vibrating device is desirably positioned between the end of the conveyor and the second shears.

The drive for this conveyor is preferably reversible, so that relatively long bales of scrap metal produced by the first shears may be carried away from the second shears, instead of toward it, when a second cutting operation is unnecessary for the intended use of the bales of scrap metal.

Having now indicated the general nature of the scrap metal shearing machine in accordance with this invention and the manner in which it operates, we will now proceed with a detailed description of a preferred embodiment of this machine with reference to the accompanying drawings in which like reference characters are used to designate like parts. In the drawings:

Figure 1:
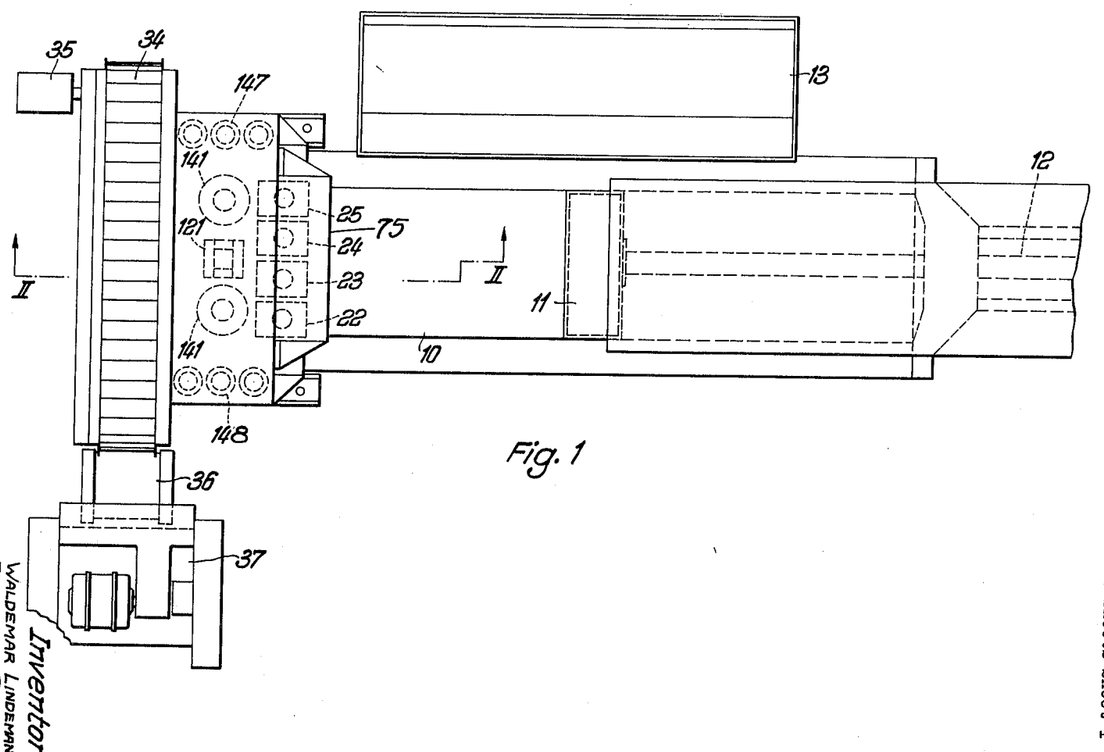
FIGURE 1 is a simplified plan of the scrap metal shearing machine, in accordance with this invention.
Figure 3:
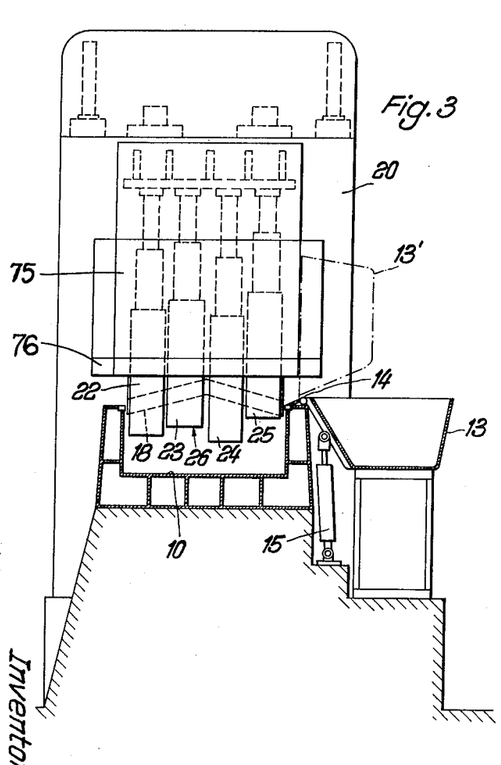
FIGURE 3 is a front elevation view in partial cross-section along the section line III—III of FIGURE 2.

Referring specifically to FIGURE 1, it will be seen that the shearing machine is provide with a trough 10 which is adapted to receive scrap metal to be compressed and cut up into bales. The feed platen 11 is horizontally moveable in the trough 10 and is operated by a hydraulic drive, of which the piston 12 is shown in dotted outline. This drive of the platen 11 is a double-acting hydraulic cylinder. The tip-trough 13 is positioned adjacent the trough 10. Referring to FIGURE 3, it will be seen that the tip-trough 13 is provided with a hinge 14 along the side of the trough 10 and a hydraulic cylinder 15 which is adapted to tip the trough to the position 13' shown in dotted outline in FIGURE 3 by the extension of its piston.

Figure 2:
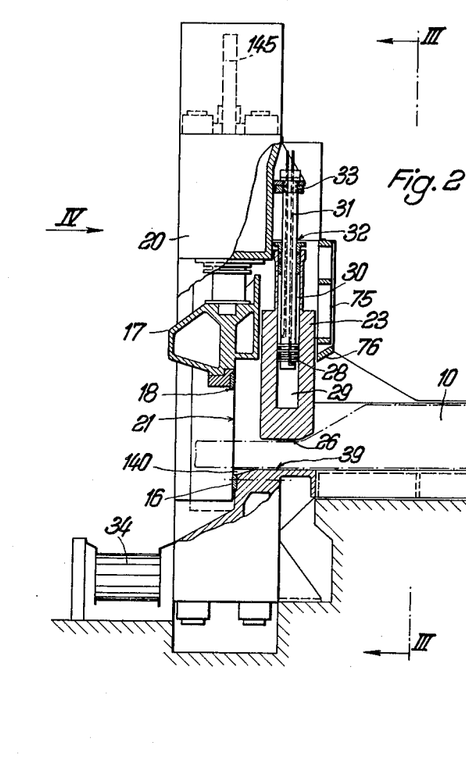
FIGURE 2 is a broken side elevation, partially in longitudinal cross-section, taken along the section line II—II of FIGURE 1.
Figure 6:
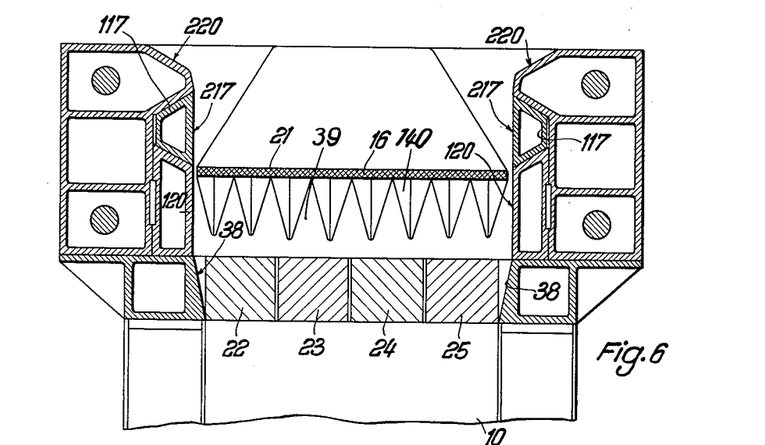
FIGURE 6 is a horizontal cross-section taken along the section line VI—VI of FIGURE 4.

The shearing machine is provided with a compression zone positioned across the forwardly end of the trough 10. As best shown by FIGURES 2 and 3, the plungers 22, 23, 24, and 25 are positioned side-by-side across the end of the trough 10 and are carried by the frame 20. The frame 20 is adapted to hold the heavy compressional forces exerted by the plungers 22, 23, 24, and 25 and by the moveable cutting knife of the machine. The plungers 22, 23, 24, and 25 are rectangular in cross-section as best shown by FIGURES 1 and 6. In FIGURE 6, the plungers 22, 23, 24, and 25 are shown in lowered position and, hence, are in cross-section. The upper edge of the stationary, lower knife or blade 16 of the machine is cross-hatched to show it clearly. This does not mean that it is in cross-section. These plungers are spaced only a very short distance apart. They cooperate to form a vertically moveable wall across the end of the trough 10. The lower surfaces 26—26 of these plungers are bearing surfaces which compress scrap metal.

The plungers 22, 23, 24, and 25 are provided with individual hydraulic drives. Each plunger has an internal cylindrical chamber as best shown by FIGURE 2 with respect to plunger 23 which forms an essential part of the hydraulic drive of the plunger. Referring specifically to FIGURE 2, it will be seen that the interior of the plunger 23 is divided by a piston 28 into two chambers 29 and 30. The piston 28 is mounted on the lower end of a piston rod 31 which is fixed at 33 to the frame 20 of the machine. The seal 32 between the piston rod 31 and the cylinder is affixed to the plunger 23 and prevents the leakage of hydraulic fluid from the chamber 30.

The plunger 23 is lowered by supplying hydraulic fluid under pressure to its lower chamber 29. The plunger is raised by placing the chamber 29 in communication with an exhaust outlet and supplying hydraulic fluid under pressure to its upper chamber 30.

Referring to FIGURES 2 and 3, the screen plate 75 extends across the total width of the plungers 22, 23, 24 and 25 and is provided at its lower edge with an inclined surface 76. The lower edge of the inclined surface 76 coincides approximately with the lower edges of the plungers when raised. The purpose of the plate 76 is to retain scrap metal which is heaped up in the trough 10 and to keep it away from the plungers 22, 23, 24 and 25, and, particularly, away from the narrow gaps between these plungers when they are in their raised position.

Referring to FIGURE 6, it will be seen that the fixed walls 38, 38 of the frame 20 adjacent the outer sides of the plungers 22 and 25 are slightly inclined, so that the cross-section of the opening through which the mat of compressed scrap metal must pass to reach the position in which it is cut widens out like a funnel. This conformation of the surfaces 38, 38 which form a channel through which compressed scrap metal passes, in effect, exerts a counter-pressure on the scrap which has a component of force in the direction of the feed-movement of the scrap which tends to counteract the lateral forces exerted by the compressed scrap which tends to jam the compressed mat and keeps the force required for the forwardly feed of the scrap, provided by the platen 11 and its hydraulic drive, within reasonable limits.

Figure 4:
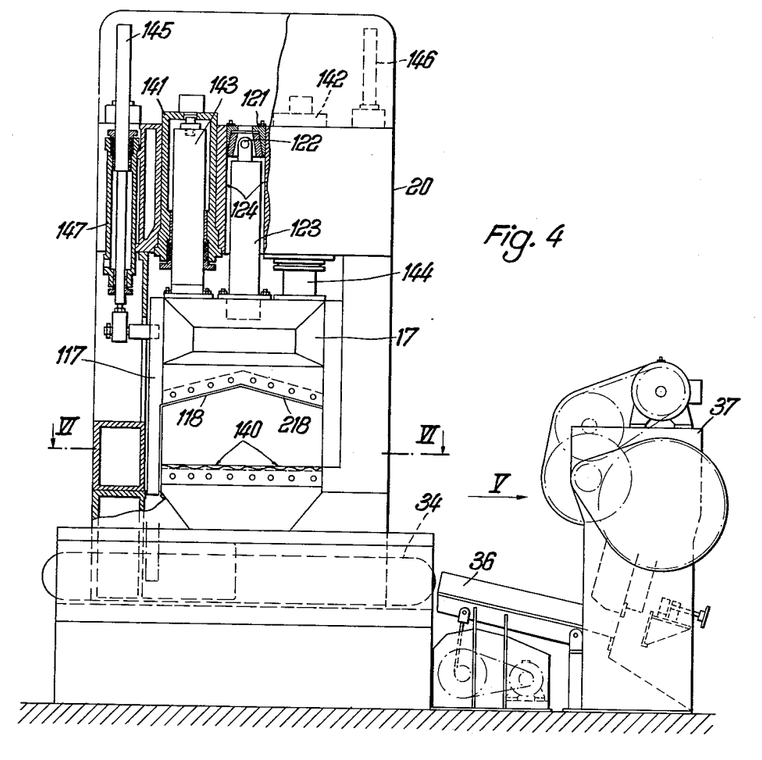
FIGURE 4 is a back elevational view, in partial cross-section looking in the direction of the arrow IV in FIGURE 2.
Figure 5:
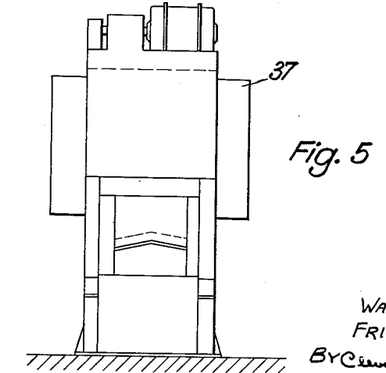
FIGURE 5 is a front elevation of a second shearing device looking in the direction of the arrow V in FIGURE 4.

As shown by FIGURE 2, the stationary lower knife 16 and the vertically moveable upper knife 18 which are mounted on a transverse knife carrier beam 17 are positioned adjacent to and on the forwardly side of the plungers 22, 23, 24, and 25. The cutting edges of the knives 16 and 18 are positioned in the cutting plane 21 and these knives are adapted to cooperate to shear a compressed mat of scrap metal. As shown by FIGURE 4, two hydraulic cylinders 141 and 142 mounted on frame 20 having pistons 143 and 144 affixed to and acting on knife carrier beam 17 function to drive the cutting knife 18 downwardly in the cutting direction. The hydraulic cylinders 147 and 148 mounted on frame 20 carry pistons 145 and 146, respectively, attached to beam 17 and are adapted to retract the knife 18 after it has gone through its cutting stroke. The effective area of the pistons 147 and 148, is considerably smaller than those of the pistons 143 and 144, since the force required to retract the knife 18 is much less than that required for the cutting of scrap metal on its downwardly stroke.

The transverse beam 17 is provided with two lateral guides 117, 117 (FIGURE 6) which move in channels in the frame 20. These lateral guides 117, 117 extend downwardly from the transverse beam 17 a distance such that when the upper knife 18 is raised, the lower ends of the guides are below the horizontal plane which passes through the edge of the lower knife 16. The inner walls 217, 217 of these guides form a continuation of the lateral walls 120, 120 of the frame 20 and a smooth transition to the walls 220, 220 and to the funnel shaped outlet formed by the walls 38, 38, described hereinbefore. These inner walls 217, 217 of the guides protect the bearing surfaces of the guides from the metal scrap.

As shown by FIGURE 4 a guide piston 121 is connected to the beam 17 by means of the rod 123 by a pivoted connection shown at 122. During the movement of the knife carrier 17, the piston 121 slides in the guide 124, and serves as an additional guide to the movement of the upper knife 18.

Figure 7:
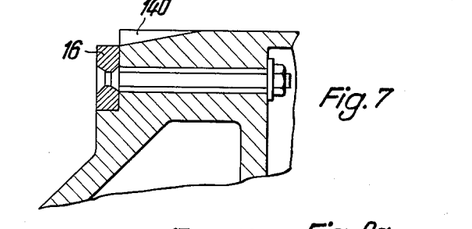
FIGURE 7 is an enlarged, fragmentary cross-section of the stationary knife of the machine and the parts associated therewith.

The knife 18 is angle shaped, and as shown by FIGURE 4, the angle of inclination of the two halves 118 and 218 relative to the lower knife 16 is advantageously relatively great. This angle of inclination of the two halves of the upper knife 18 enables the scrap to be cut cleanly without pressing it laterally in an outwardly direction under the cutting pressure applied by the hydraulic cylinders 141 and 142 and tends to prevent the scrap from jamming against the side walls 120, 120 of the frame 20. This angle of inclination of the knife 18 has a tendency to deflect the scrap laterally toward its center line of travel. The bottom plate 39 which forms a forward extension of the bottom of the trough 10 is provided with notches or grooves 140—140 as best shown by FIGURES 6 and 7. These notches 140—140 are of triangular, vertical cross-section transversely of the direction of feed of the scrap metal, with their greatest depth adjacent the fixed lower knife 16. This depth decreases uniformly in a direction opposite to the direction to the direction of feed. During the cutting of the scrap metal by the action of the upper knife 18, the metal is pressed into the grooves 140—140 and is thereby prevented from lateral, inwardly, movement, which would otherwise be caused by the inclination of the two halves 118 and 218 of the knife 18.

The various hydraulic drives for this scrap shearing machine can be connected together by a controlling device which makes the individual operations, to a large extent, independent of manual operation. The method of operation of the shearing machine will now be described without regard to whether or not it is provided with an automatic controlling device.

The tip trough 13 is filled with scrap while the shears are operating. When the trough 10 is empty and the feed platen is retracted, the trough 13 is tipped to the position shown in dotted outline at 13' and its load of scrap dumped into the trough 10. This tip-trough 13 thus enables the shearing machine to receive a substantially continuous feed of scrap metal, which need be interrupted only during the brief interval of time during which the trough is being tipped to unload it.

When the trough 10 has been filled with scrap metal and the plungers 22, 23, 24, and 25 are in their raised position, the feed platen 11 is moved forward a certain distance which depends upon the nature of the scrap and which may be approximately equal to the width of the plungers 22, 23, 24, and 25 in the direction of feed. During this feeding movement, the inclined surface 76 of the screen plate 75 facilitates the movement of the scrap metal into the pressure zone below the lower surface 26—26 of the plungers 22, 23, 24, and 25.

When the feeding movement of the platen 11 is completed, the plungers 22, 23, 24, and 25 are lowered. The plungers are pressed on the scrap lying beneath them with considerable pressure, so that the scrap metal is compressed into a more or less compact mass. Since the hydraulic drives of the four plungers are independent of one another with no positive connection between their movements, each plunger is pressed under the hydraulic pressure acting on it as deeply onto or into the scrap metal as the particular portion of the scrap beneath it will permit. Usually, therefore, the plunger come to rest in different positions as shown in FIGURE 3 when compressing unsorted scrap metal. If, for example, a relatively large or rigid piece of scrap metal brings the plunger 25 to rest at a relatively great distance from the bottom surface 39, this has no effect on the terminal position of the adjacent plunger 24. This plunger moves downwardly independently as far as it is permitted to do so by the scrap below its own lower surface 26. In this way the scrap is compressed to an approximately uniform extent over its entire cross-section and is squeezed together into a compact mass.

During the initial pressing process, the knife 18 remains inoperative, because there is then no scrap in the cutting zone. Only when the plungers have again been raised and the feed plunger 11 has moved the mass of scrap a further step forward does the compressed and compacted scrap move from the compression zone into the cutting zone and the knife 18 then cuts off relatively narrow, long strips of compressed scrap. The length of these strips usually approximates the width of feed trough 10.

If, after a number of operating steps, the trough 10 is finally emptied, the feed plunger is fully retracted and the trough 10 is again filled with scrap metal from the tip-trough 13.

The shears consisting of the knives or blades 16 and 18 may, for example, have a cutting width of two meters. The term "cutting width" means the effective length of the knife edges. A suitable measurement for the breadth of the plungers in the direction of feed is 0.6 metres. In order to be able to treat as much scrap as possible without re-filling the trough, the trough 10 may have a relatively great length such as, for example, 12 metres. The distance through which the plungers 22, 23, 24, 25, compress the scrap can be relatively great. In a machine having the above-mentioned dimensions, the plungers may suitably have a stroke of about 1–2 metres and the knives a somewhat greater stroke. Nevertheless, since it is not necessary always to work with a full stroke, means are provided for reducing the stroke, for example, in the form of adjustable end switches, as more fully discussed hereinafter.

Experience has shown that, in general, it is sufficient to allow the plungers 22, 23, 24, 25 to act on the scrap with a force of about 100 tons per plunger. For cutting the scrap which has been compacted by the plungers, a force of the order of 1,000–1,500 tons is, in general, sufficient. Nevertheless, considerably smaller forces, namely about half the aforesaid amounts, will usually be found to be sufficient, so that the maximum pressure is then applied only when it is found that the cut cannot be made with a lower pressure.

In order to keep power requirements and the consumption of hydraulic liquid within small limits, the plungers 22, 23, 24, and 25, and the knife 18, when they are lowered, are first moved downwardly on to the scrap under the action of their own weight. Only when they are in contact with the scrap is pressure applied to their driving cylinders.

A conveyor 34 may be, if desired, positioned adjacent the cutting plane 21 of the knives 16 and 18 which is adapted to receive compressed bundles of scrap metal cut by the cooperative action of the knives 16 and 18 as illustrated by FIGURES 1 and 4. The conveyor 34 is driven by the motor 35 and runs parallel to the cutting plane 21. A vibrating slide 36 is located at the end of the conveyor 34 and is adapted to carry bundles of scrap to a second shears 37 of any suitable construction.

The compressed bundles of scrap metal cut by the knives 16 and 18 fall onto the conveyor with their freshly cut surfaces, i.e. the longest dimension, generally paralleling the direction of travel of the conveyor, and are delivered to the shears 37 in a position to be cut in a plane approximately normal to the planes of the first cuts. The transverse cut made by the shears 37 produces smaller compressed bundles of scrap which are, for example, suitable for melting in an electric furnace.

The motor 35 which drives the conveyor 34 is preferably reversible, so that the bundles of compressed scrap cut by the knives 16 and 18 can be moved to the end of the conveyor remote from the shears 37 without being further cut up, for example, when the compressed bales of scrap metal are to be charged into a Siemens-Martin furnace.

Figure 8:
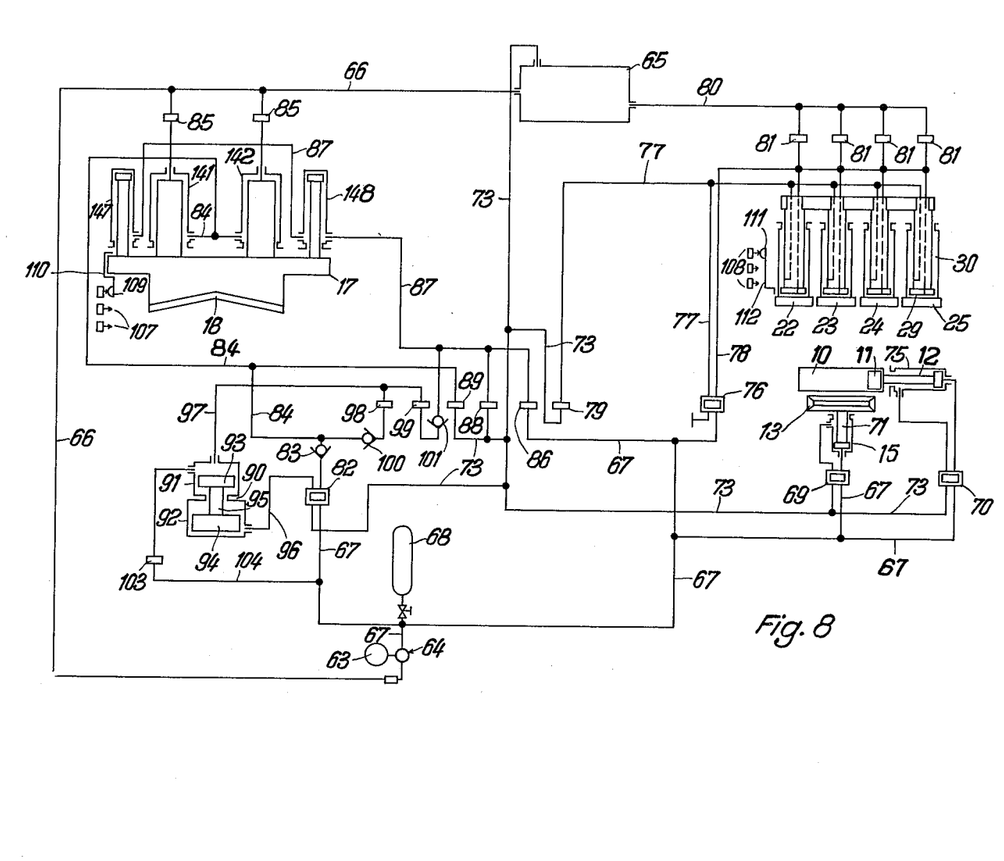
FIGURE 8 is a schematic diagram of the hydraulic system which operates and controls the shearing machine.

The hydraulic system which operates and controls this shearing machine, illustrated diagrammatically by FIGURE 8, includes two different control valves which are unique. These valves are illustrated diagrammatically by FIGURES 9a and 9b and will be described, before turning to a description of the remainder of the system illustrated by FIGURE 8.

Figure 9A:
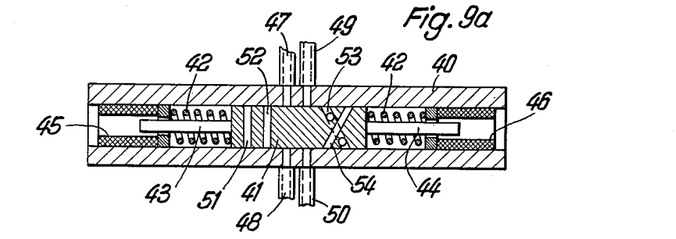
FIGURE 9a is a cross-section of a double-acting solenoid valve of a type which forms part of the hydraulic system of this machine.

Referring to FIGURE 9a, it will be seen that the valve there illustrated, comprises a casing 40 in which is positioned a slide 41 which is held in the central position illustrated by the springs 42, 42. The rods 43 and 44 which are fixed to the two end surfaces of the slide 41 form the moveable cores, respectively, of two solenoids 45 and 46. When the solenoid 45 is energized, the slide 41 is moved into its left-hand end position against the action of the spring 42. Similarly, when the solenoid 46 is energized, the slide 41 is moved to its right-hand end position.

Four conduits for hydraulic fluid 47, 48, 49 and 50 are connected through perforations in the casing 40 to its internal chamber in which the slide 41 moves under the actions of the solenoids 45 and 46 and the springs 42, 42. The slide 41 has two parallel perforations 51 and 52, as well as two inclined perforations 53 and 54 which cross one another, but which are not in communication with one another.

The parallel perforations 51 and 52 pass through the slide 41 at positions which place them in register with the orifices of the conduits 47, 48, 49 and 50, when the solenoid 46 is energized, to connect conduit 47 with conduit 48 by the perforation 51, and to connect conduit 49 with conduit 50 by the perforation 52.

The inclined perforations 53 and 54 pass through the slide 41 at positions and at inclinations which place them in register with the orifices of the conduits 47, 48, 49 and 50 when the solenoid 45 is energized, to connect conduit 47 with conduit 50 by the perforation 53 and to connect conduit 49 with conduit 48 by perforation 54.

When operating in the hydraulic system for the shearing machine in accordance with this invention, the valve illustrated by FIGURE 9a closes the ends of conduits 47, 48, 49 and 50 and stops any flow of hydraulic fluid through them when neither of its solenoids is energized and its slide 41 is held in its central location by the springs 42, 42. When its solenoid 46 is energized by the passage of an electric current and solenoid 45 is de-energized, this valve permits the flow of hydraulic fluid between conduits 47 and 48 and between conduits 49 and 50. On the other hand, when the solenoid 45 is energized and the solenoid 46 is deenergized, this valve permits the flow of hydraulic fluid between conduits 47 and 50 and between conduits 49 and 48.

Figure 9B:
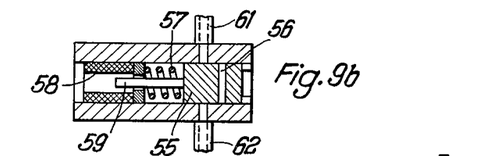
FIGURE 9b is a cross-section of a single-acting solenoid valve of a type which also forms part of the hydraulic system of the machine.

The valve illustrated by FIGURE 9b, consists of a casing, which carries a slide 55 having a single transverse perforation 56 which is held by a spring 57 in the position illustrated. The solenoid core 59 is connected to the end of the slide 55 and extends into the solenoid 58. The conduits 61 and 62 are connected through perforations in the casing to its internal chamber in which the slide 55 moves under the actions of the solenoid 58 and the spring 42. The transverse perforation 56 passes through the slide 55 at a location which brings its ends into register with the orifices of the conduits 61 and 62 when the solenoid is energized and moves the slide 55 to its left-hand position against the action of the spring 57.

When operating in the hydraulic system of this shearing machine, the valve illustrated by FIGURE 9b prevents the flow of hydraulic fluid between conduits 61 and 62 when its solenoid 58 is de-energized. Conversely, when its solenoid 58 is energized by the passage of an electric current, the valve permits the flow of hydraulic fluid between conduits 61 and 62.

In FIGURE 8, the location of each valve of the type illustrated by FIGURE 9a is indicated by a rectangle having a double boundary line, while the location of each valve of the type illustrated by FIGURE 9b is designated by a rectangle having a single boundary line. In describing the hydraulic system illustrated by FIGURE 8, the valve illustrated by FIGURE 9a will be termed the "double acting solenoid valve," while that illustrated by FIGURE 9b will be termed the "single acting solenoid valve".

As will be appreciated from the fact that the valve illustrated by FIGURE 9a is operated by two solenoids and the valve illustrated by FIGURE 9b, by a single solenoid, this shearing machine is provided with an electrical system which includes suitably located limit switches to energize and de-energize the solenoids of the various valves which are included in the hydraulic system of the shearing machine. Although various of the limit switches are shown by FIGURE 8, for the purposes of simplicity, that figure does not include an electrical wiring diagram, since the required electrical connections will be obvious to those skilled in the art, in view of the following detailed description of the hydraulic system of the shearing machine.

Referring specifically to FIGURE 8, the hydraulic system of this scrap shearing machine includes a pump 64, driven by a motor 63, which is adapted to pump hydraulic fluid from the reservoir 65 through the conduit 66 and deliver it under pressure to the pressure conduit 67 which forms a branched header for the entire system. The header conduit 67 is provided with a pressure surge vessel 68.

The part of the hydraulic system which operates the scrap metal feed for this shearing machine will be described first. Two of the branches of the header conduit 67 are connected to the double acting solenoid valves 69 and 70, respectively. The valve 69 is connected by conduits to the hydraulic cylinder 15 (FIGURE 3) which operates the tip-trough 13, while the valve 70 is connected by conduits to the double acting cylinder 12 which operates the feed platen 11 in the trough 10 of the shearing machine.

The piston 71 is moveable in the double acting hydraulic cylinder 15 and activates the trough 13 to move it from its normal position to its position 13' (FIGURE 3). When the valve 69 is in its central position with neither of its solenoids energized, both of the two chambers of the hydraulic cylinder 15 are shut off from the pressure header 67 and the piston 71 is at rest. When the solenoid 46 of the valve 69 is energized, the pressure conduit 67 is connected to the lower chamber of the hydraulic cylinder 15 and the upper chamber of the cylinder 15 is connected to the reservoir 65 by the exhaust conduit 73 and the piston 71 is extended from the cylinder 15 to tip the trough 13 to its position 13' (FIGURE 3). When the solenoid 45 of the valve 69 is energized and the solenoid 45 is de-energized, the connections to the conduits for hydraulic fluid are reversed to connect the pressure header 67 to the upper chamber of cylinder 15 and its lower chamber connected by the exhaust conduit 73 to the reservoir 65, and the piston 71 is retracted to return the tip-trough 13 to its normal position in which it receives scrap metal.

The solenoid 45 may be energized by either manual control or by an automatic control device. It is de-energized and the solenoid 46 energized by a suitably positioned limit switch or switches which are, for example, affixed to the frame of the machine and activated by the action of a roller or cam affixed to the tip-trough itself, when the tip-trough reaches its position 13'. The solenoid 46 is de-energized by a limit switch which is activated by the return of the tip-trough to its normal position. Limit switches required for these purposes are conventional and are not shown by FIGURE 8.

The double acting solenoid valve 70 operates the piston 12 in the double acting hydraulic cylinder 75 to move the feed platen 11 back and forth in the feed trough 10 in exactly the same manner that the valve 69 operates the piston 71. The valve 70 connects one chamber of the cylinder 75 to the pressure conduit 67 and its other chamber to the exhaust conduit 73 when one of its solenoids is energized and the other de-energized and then reverses these connections when the other solenoid is energized and the first solenoid is de-energized.

The solenoids of the valve 70 are energized and de-energized by a series of limit switches which are operated by the movement of the feed platen 11 or the piston 12. As already explained, the feed platen 11 moves forwardly in a series of step-wise movements, each of which determines the length of the bale of compressed scrap which is cut-off by each stroke of the knife 18. Thus, for example, each step-wise movement of the platen 11 may be 0.6 meter in a shearing machine having the dimensions given hereinbefore. Such step-wise movement, without intermediate withdrawals of the platen 11 is effected by limit switches which de-energize both solenoids of the valve 70 during the compression and cutting operations of the shearing machine and thereby hold the platen 11 stationary in the position to which it has traveled when the switch is activated, and then activates the solenoid 46 to cause a forwardly movement of the platen 11 for the next increment of its travel. The solenoid 45 to cause the withdrawal of the piston 12, is energized only when the platen 11 has reached its most forwardly position.

It is desirable to have both the full stroke of the piston 12 and the platen 11, as well as each of their step-wise forwardly movements adjustable so that they can be controlled in relation to the amount and the nature of the scrap metal in the feed trough 10. Such adjustability is secured by providing a plurality of limit switches for the control of the double acting solenoid valve 70 and at any particular time utilizing the switches which are positioned to give the particular length to step-wise forwardly movement or of the length of the full stroke of the piston 12 and the feed platen 11 which is desired in view of the quantity and the nature of the scrap metal involved. The requisite number of limit switches required for this control may, for example, be fixed to the frame of the machine and a cooperating roller or cam affixed to the feed platen 11 or its piston 12 in a position to contact the switches as the platen 11 moves. The movement of the platen 11 is controlled by the selection of the particular switches which activate the solenoids of the controlling hydraulic valves upon being contacted by the said roller or cam. Thus, in any one operation, a majority of the series of limit switches are inactive as far as the operation of the platen 11 is concerned, although they may be contacted by the activating roller or cam carried by the feed platen 11 or its piston 12.

The double acting solenoid valve 76 and the single acting solenoid valves 79 and 81—81 operate the plungers 22, 23, 24, and 25. Another branch of the pressure header 67 is connected to the valve 76 which controls the supply of hydraulic fluid under pressure to either conduit 77 or to conduit 78. The conduit leading to valve 76, corresponding to conduit 48 of FIGURE 9a is always closed. Conduit 78 is connected to the lower chambers 29, 29 of the plungers 22, 23, 24, and 25, while the conduit 77 is connected to the upper chambers 30, 30 of these plungers. Further, the conduit 77 is connected by a single acting solenoid valve 79 to the exhaust conduit 73 leading to the reservoir 65. Exhaust condit 80 leading to the reservoir 65 is connected through the valves 81—81 to the lower chambers 29—29 of the plungers 22, 23, 24, and 25.

To lower the plungers 22, 23, 24, and 25 onto scrap positioned below their lower surfaces 26—26, the valves 79 and 81 are opened by energizing their solenoids 58, 58 by a manually or automatically controlled electrical switch, while the valve 76 is kept in its centrally closed position by keeping both of its solenoids 45 and 46 de-energized. The plungers 22, 23, 24, and 25 fall under their own weight, while their lower chambers 29—29 are filled with hydraulic fluid and their upper chambers are emptied of hydraulic fluid through the conduits 77, valve 79 and exhaust conduit 73. The valves 81—81 are then closed by de-energizing their solenoids 58—58 and while the valve 79 is still open, the lower chambers 29—29 of the plungers are supplied with hydraulic fluid under pressure from the pressure header 67, through the conduit 78 by energizing solenoid 46 of the valve 76. This action furnishes the powerful compression action of the plungers 22, 23, 24, and 25. When the plungers 22, 23, 24, and 25 are to be raised, the valve 79 is closed by de-energizing its solenoid 58, and the valves 81—81 opened by energizing their solenoids, and the upper chambers 30—30 of the plungers are supplied with hydraulic fluid under pressure through the conduit 77 from the pressure header 67, by energizing the solenoid 45 of the valve 76. As the upper chambers 30—30 are filled with hydraulic fluid from the pressure header 67 through the conduit 77, hydraulic fluid is forced from the lower chambers 29—29 through the open valves 81—81 and the conduit 80 to the reservoir 65. The double acting solenoid valve 82 is the primary operating valve for the operation of the cylinders of the upper moveable knife 18 of this machine. Another branch of the pressure header 67 is connected to the valve 82 which is connected through a non-return or check valve 83, by conduit 84, to the chambers of the single acting, downwardly bearing hydraulic cylinders 141 and 142. These cylinders 141 and 142 are also connected by the single acting solenoid valves 85, 85 to the exhaust conduit 66 which is the connecting conduit between the reservoir 65 and the intake side of the pump 64. The pressure header 67 is connected through another branch to the single acting solenoid valve 86 which is, in turn, connected by the conduit 87 to the chambers of the single acting, upwardly bearing cylinders 147 and 148. The conduit 87 acts both as a pressure conduit and as an exhaust conduit for the cylinders 147 and 148. The conduit 87 is also connected by the single acting solenoid valve 88 to the exhaust conduit 73. Further, the single acting solenoid valve 89 is connected to the exhaust conduit 73 and to conduit 84 and establishes a passageway for hydraulic fluid between them when its solenoid 58 is energized.

When the upper shearing knife 18 is to be permitted to drop under its own weight onto compressed scrap metal which has been positioned below it by the forwardly movement of the feed platen 11, the valves 85, 85 and 88 are opened by energizing their solenoids 58—58, whereas the valves 86 and 89 are left closed by the action of their springs 57, 57, by leaving their solenoids 58, 58 de-energized, while the valve 82 is left closed by the action of its springs 42, 42, by leaving its solenoids 45 and 46 de-energized. The knife 18 and its associated carrier beam 17 then drop since the closed position of the valves 82, 86 and 89 shut off the connections of both the cylinders 147 and 148 and of the cylinders 141 and 142 from their supply of high pressure hydraulic fluid from the pressure header 67. However, as the knife 18 falls, the cylinders 141 and 142 are filled with hydraulic fluid, while the cylinders 147 and 148 are emptied of hydraulic fluid. The hydraulic fluid which fills the cylinders 141 and 142 is supplied from the conduit 66 through the open valves 85, 85, and is under low pressure since the fluid in conduit 66 is on the intake side of the pump 65. The hydraulic fluid from the cylinders 148 and 148 drains through conduit 87 and the open valve 88 into the exhaust conduit 73 and, finally, back to the reservoir 65.

To apply the power to the knife 18 to cut the compressed metal on which it is resting after it falls as described hereinbefore, the valve 82 is opened to connect the pressure header 67 through the check or non-return valve 83 with conduit 84, which is, in turn, connected to the cylinders 141 and 142. This is accomplished by energizing its solenoid 46 by the action of a limit switch as described hereinafter. At the same time, the valves 85, 85 and 88 are closed by energizing their solenoids 58—58 while the valve 89 remains closed.

This positioning of the valves places the hydraulic fluid in the cylinders 141 and 142 under the pressure supplied by the pump 64 directly through the pressure header 67. The valve 86 which was closed is simultaneously opened by energizing its solenoid 58 so that hydraulic fluid under pressure is supplied to the cylinders 147 and 148 from the pressure header 67 through the conduit 87. The force exerted by the cylinders 147 and 148 opposes that applied by the cylinders 141 and 142. However, the cylinders 141 and 142 have a much larger effective area than the cylinders 147 and 148, so the net result is that a powerful cutting force is applied to the knife 18.

If the pressure in the pressure header 67 is sufficient to apply the force required to cut the mat of compressed metal beneath the knife 18, the knife is then raised. This is the force which is created by what has been referred to hereinbefore as the lower stage of pressure. The knife 18 is raised from its terminal cutting position by opening the valves 85, 85 and 89 by energizing their solenoids 58—58, while closing the valves 82 and 88, by de-energizing their solenoids 45 and 46 and 58, respectively. This adjustment of the valves permits the pump to continue to apply pressure through the pressure header 67, the still open valve 86 and the conduit 87 to the cylinders 147 and 148. The continued pressure applied to the cylinders 147 and 148, with the relaxation of the pressure on cylinders 141 and 142, raises the knife carrier beam 17 and the knife 18.

If the pressure in the pressure header 67 is not sufficient to apply the force required for making the cut, a hydraulic pressure converter forming a part of the hydraulic system of the shearing machine is brought into action. The pressure converter builds up the pressure in the system to that referred to hereinbefore as the higher stage of pressure. The pressure converter consists of two cylinders 91 and 92 having pistons 93 and 94 connected together by a rod 95. The cylinder 92, carrying piston 94 which has a higher effective area than piston 93 in cylinder 91, is connected by conduit 96 to the valve 82 by which it can be connected either to the pressure header 67 or to the exhaust conduit 73. The cylinder 91, carrying piston 93, having the smaller effective area of the two cooperating pistons, is connected by the conduit 97 to the single acting solenoid valves 98 and 99. The valve 98 connects the conduit 97, through a non-return valve 100, to the conduit 84 and, in turn, to the cylinders 141 and 142. The valve 99 connects the conduit 97 through a non-return valve 101 to the conduit 87 and, in turn, to the cylinders 147 and 148. The cylinder 91 is also connected through the valve 103 by the conduit 104 to the pressure header 67.

To explain the operation of the pressure converter, it will be assumed that the pistons 93 and 94 are in the position illustrated by FIGURE 8, with the cylinder 92 almost empty and the cylinder 91 almost full. When a cut is to be made by the use of higher pressure than that obtainable directly from the pump 64, the valves 85, 85, 88, 89, 99 and 103 are closed and the valves 86 and 98 are open. The valve 82 is switched to the position in which it connects the pressure header 67 with conduit 96 by energizing its solenoid 45 and de-energizing its solenoid 46 to supply hydraulic fluid under pressure to the cylinder 92. This pressure acts on piston 94 which, in turn, moves piston 93. The smaller effective area of piston 93 causes it to build up a higher hydraulic pressure in cylinder 91 which is higher than that exerted on piston 94 in cylinder 92 by the ratio of the area of the two pistons. The higher pressure built up in cylinder 91 is applied to the cylinders 141 and 142 through the hydraulic fluid in conduit 97, the open valve 98 and the conduit 84. Pressure is simultaneously applied to cylinders 147, 147 from the pressure header 67, the open valve 86, and the conduit, in exactly the same manner as when cutting without the use of the pressure converter. Alternatively, the higher stage of pressure from the cylinder 91 of the pressure converter can be applied to cylinders 147 and 148 by opening the valve 99 and closing the valve 86 to permit the pressure to act through the non-return valve 101 and the conduit 87.

When cutting with the increased pressure supplied by the pressure converter, the pistons 94 and 93 of the pressure converter move in the direction which gradually decreases the volume of hydraulic fluid in the cylinder 91. They are, however, moved in the reverse direction when not in use for high pressure cutting. This is accomplished when cutting under normal pressure, by opening the valve 103, while connecting conduit 96 with the exhaust conduit 73 by shifting the setting of the valve 82 by energizing its solenoid 46, while de-energizing its solenoid 45. This positioning of the valves applies the hydraulic pressure from the pressure header 67 to the piston 94, while the piston 93 is substantially relieved of pressure by opening its cylinder 91 through conduit 96 to the exhaust conduit 73.

As noted hereinbefore, the return cylinders 147 and 148 are kept under pressure, while a cut is being made by the force exerted by the main cylinders 141 and 142, both when using the normal pressure and the higher pressure created by the pressure converter in the main cylinders. As already noted, when using the higher stage of pressure created by the pressure converter in the main cylinders 141 and 142, the opposing, return cylinders 147 and 148 may be supplied either with the lower or the higher stage of pressure as may be desired. The maintenance of pressure in the return cylinders 147 and 148 ensures that at the moment the cut is ended, the knife 18 is not given any excessive acceleration, as previously mentioned.

To render the operation of this shearing machine as economical as possible, means are provided which enables the stroke of the knife 18 and of the plungers 22, 23, 24, and 25 to be reduced, so that when operating with a small heap of scrap metal, the knife and the plungers need not be unnecessarily raised through their maximum stroke. This means consists, as diagrammatically illustrated in FIGURE 8, of the series of end switches 107—107 to control the stroke of the knife 18 and of the similar series of end switches 108—108 to control the stroke of the plunger 22. The other plungers are equipped with similar series of switches not shown by the figure.

In the case of each of the series of switches 107—107 and 108—108, the switches are arranged one under the other. The switches 107—107 are activated by a cam 109 which is fixed to the arm 110 on the knife beam 17. Similarly, a cam 111 on the arm 112 attached to plunger 22 activates its end switches 108—108 in a similar manner. In the case of each of the series of switches, the end switch which is uppermost controls the operation of the knife 18 or the plunger 22, as the case may be, at its full stroke, by disconnecting the drive when the highest position is reached. The stroke is reduced by switching the control of the drive to one of the lower situated end switches.

The foregoing arrangement of end switches to alter the stroke of the plungers 22, 23, 24, and 25 and of the cutting blade or knife 18 of this shearing machine and the arrangement of end switches to control the full stroke and the step-wise forwardly feed strokes of the feed platen 11 in the trough 10 are identical in principle. In each case the control of the stroke involved is determined by the positioning and the number of switches utilized.

The foregoing details as to the construction of a preferred embodiment of the shearing machine in accordance with this invention and as to the hydraulic system by which the shearing machine is operated have been given only for the purpose of fully illustrating the invention. It will be fully understood that many modifications and changes can be made in these details without departing from the spirit of our invention or the scope of the claims which follow. Thus, for example, whereas the shearing machine which is described by the foregoing includes a series of four plungers positioned side-by-side for compressing the scrap into a mat before it is cut, a smaller or larger number of such plungers may be used. After, the dimensions of the shearing machine and the forces which its hydraulic system is adapted to apply can be varied within wide limits to suit it for the particular class of unsorted scrap metal which it is intended to handle and it may be noted that the relatively large dimensions and high pressures which have been mentioned hereinbefore are intended to exemplify a shearing machine adapted for handling heavy ferrous metal scrap. Further, it will be understood that the operation and control of the feed platen, the plungers, and the moveable shearing knife of the machine can be varied over a wide range by the number of control switches utilized and the positioning of those switches. Many other such modifications in the details of this shearing machine will be obvious to those skilled in this art.

We claim:

1. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual drives for the operation of each of the said plungers, a shearing means positioned adjacent the said plungers which is capable of cutting a mat of compressed unsorted scrap metal including both light and heavy scrap, with said shearing means including a movable blade adapted to operate in a substantially vertical plane adjacent to said plungers, and a feeding means adapted to place loose scrap metal in position for compression by the said plungers and then in position for cutting by the said shearing means, in discontinuous movements which alternate with the movement of the said plungers to compress and hold the scrap metal and with the movement of the said shearing means to cut the compressed scrap metal.

2. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual hydraulic driving means for the operating of each of the said plungers, a shearing means positioned adjacent the said plungers which is capable of cutting a mat of compressed unsorted scrap metal including both light and heavy scrap, said shearing means including a movable blade adapted to operate in a substantially vertical direction, a hydraulic drive for said shearing means, and a feeding means adapted to place loose scrap metal in position for compression by the said plungers and then in position for cutting by the said shearing means, in discontinuous movements which alternate with the movement of the said plungers to compress and hold the scrap metal and with the movement of the said shearing means to cut the compressed scrap metal.

3. A machine adapted for the shearing of unsorted scrap metal described by claim 2 in which each of the plungers comprises a fixed piston and a movable cylinder carried by the said piston.

4. A machine adapted for the shearing of unsorted scrap metal, which comprises a plurality of rectangular plungers arranged side-by-side and adapted to operate along a substantially vertical axis for independently compressing scrap metal and for holding compressed scrap metal in a stationary position while it is being sheared, individual drives for the operation of each of the said plungers, a shearing means positioned adjacent the said plungers which is capable of cutting a mat of compressed unsorted scrap metal including both light and heavy scrap, said shearing means including a movable blade adapted to operate in a substantially vertical direction, and a feeding means adapted to place loose scrap metal in position for compression by the said plungers and then in position for cutting by the said shearing means, in discontinuous movements which alternate with the compression of the scrap by the said plungers and the cutting of the scrap by the said shearing means.

5. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual drives for the operation of each of the said plungers, a shearing means positioned adjacent the said plungers which is capable of cutting a mat of compressed unsorted scrap metal including both light and heavy scrap, with said shearing means including a movable blade adapted to operate in a substantially vertical plane adjacent to said plungers, a means for driving the said shearing means, a feeding means adapted to place loose scrap metal in position for compression by the said plungers and then in position for cutting by the said shearing means into bales by discontinuous movements which alternate with the compression of the scrap by the said plungers in the cutting thereof by the said shearing means, and inclined surfaces positioned laterally of the said plungers which form a passageway for scrap metal which widens in the direction of the said shearing means and tends to prevent the jamming of compressed scrap metal in the said passageway as it is moved into position to be sheared.

6. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual drives for the operation of each of the said plungers, a movable upper shearing blade, means for driving said movable shearing blade along a substantially vertical axis, a fixed lower shearing blade adapted to cooperate with the said movable blade to cut compressed unsorted scrap metal including both light and heavy scrap, a drive for the said movable blade, a bottom member having grooves disposed adjacent said lower shearing blade and in front of the shearing plane of the said blades which is adapted to hold a mat of compressed scrap metal against lateral movement while it is being cut by the said shearing blades, and a feeding means adapted to place loose scrap metal in position for compression by the said plungers and then in position for cutting by the said shearing blades by discontinuous movements which alternate with the compression of the scrap by the said plungers in the cutting of the compressed mat by the said blade.

7. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual drives for the operation of each of the said plungers in a substantially vertical direction of movement, a metal screen plate positioned in front of the said plungers to prevent scrap metal from coming into contact with the said plungers when in their raised position, a shearing means positioned adjacent the said plungers which is capable of cutting a mat of compressed unsorted scrap metal including both light and heavy scrap, said shearing means including a movable blade adapted to operate in a substantially vertical direction, and a feeding means adapted to place loose scrap metal in position for compression by the said plungers and then in position for cutting by the said shearing means by discontinuous movements which alternate with the compression of the scrap by the said plungers in the cutting of the compressed mat by the said shearing means.

8. A machine adapted for the shearing of unsorted scrap metal as described by claim 7 in which the metal screen plate adjacent its plungers has a forwardly inclined guide surface for scrap metal along its lower edge.

9. A machine adapted for the shearing of unsorted scrap metal, which comprises a plurality of plungers arranged side-by-side and adapted to operate along a substantially vertical axis for independently compressing scrap metal and for holding compressed scrap metal in a stationary position while it is being sheared, individual drives for the operation of each of the said plungers, a movable upper shearing blade, a fixed lower shearing blade adapted to cooperate with the said movable blade to cut a mat of compressed scrap metal, a drive for the said movable blade adapted to operate said blade along a vertical axis, and a means whereby said plungers can be caused to compress scrap metal and the said movable blade to simultaneously move to cut compressed scrap metal, and a feeding means adapted to place loose scrap metal in position for compression by the said plungers and then in position for cutting by the said shearing means into bales by discontinuous movements which alternate with the compression of the scrap by the said plungers in the shearing of the compressed scrap by the said shearing means.

10. A machine adapted for the shearing of unsorted scrap described by claim 1, in which the said feeding means comprises a feed trough for the reception of loose scrap metal positioned in front of the said plungers, a feed platen which is movable in said trough to propel scrap metal therein in the direction of the said plungers, a means for moving the said feed platen forwardly in steps toward the said plungers, and a means for retracting the said feed platen to its initial position.

11. A machine adapted for the shearing of unsorted scrap described by claim 1, in which the said feeding means comprises a feed trough for the reception of loose scrap metal positioned in front of the said plungers, a feed platen which is movable in said trough to propel scrap metal therein in the direction of the said plungers, a means for moving the said feed platen forwardly in steps toward the said plungers, and a means for retracting the said feed platen to its initial position, a tip-trough disposed beside the said feed trough, and means for tipping the said tip-trough when the feed plunger is withdrawn in the feed trough, to cause scrap metal in the tip-trough to fall into the feed trough.

12. A machine adapted for the shearing of unsorted scrap metal as described by claim 2, in which the hydraulic driving means for the said shearing means comprises at least one hydraulic cylinder operative in the direction of cut to move the movable blade of the said shearing means and at least one cylinder operative in the opposite direction which has a return piston having a smaller effective area than the first mentioned cylinder, means for supplying hydraulic fluid under pressure to both pistons for the purpose of operating the said movable blade for cutting a mat of compressed scrap metal and a means for supplying hydraulic fluid under pressure only to the return piston to retract the said movable cutting blade from its final cutting position.

13. A machine adapted for the shearing of unsorted scrap described by claim 1, in which the said shearing means comprises a fixed blade adapted to cooperate with the movable blade of the said shearing means for cutting of compressed scrap metal and means for adjusting the stroke of the said movable blade.

14. A machine adapted for the shearing of unsorted scrap described by claim 1 which includes means by which the stroke of the said plungers may be adjusted.

15. A machine adapted for the shearing of unsorted scrap described by claim 1 in which the said feeding means comprises a feed trough for the reception of loose scrap metal positioned in front of the said plungers, a feed platen which is movable in the said trough, a means for moving the said feed platen in steps toward the said plungers, a means for retracting the said feed platen to its initial position and a means for adjusting the stroke of the said feed platen in its step-wise forwardly movements.

16. A machine adapted for the shearing of unsorted scrap described by claim 1 in which the said feeding means comprises a feed trough for the reception of loose scrap metal positioned in front of the said plungers, a feed platen which is movable in the said trough, a means for moving the said feed platen in steps toward the said plungers, a means for retracting the said feed platen to its initial position and a means for adjusting the total stroke of the said feed platen.

17. A machine adapted for the shearing of unsorted scrap metal described by claim 1 in which said shearing means comprises a laterally positioned lower fixed blade, a movable laterally positioned beam adapted to operate along a vertical axis which carries the movable blade of the said shearing means, vertical guide members for the said beam, the said fixed blade being adapted to cooperate with the said movable blade to shear a mat of compressed metal.

18. A machine adapted for the shearing of unsorted scrap metal as described by claim 1 in which said shearing means comprises a laterally positioned lower fixed blade, a movable laterally positioned beam adapted to operate along a vertical axis on which the movable blade of the said shearing means is mounted, vertical guide members for the said beam, the said movable blade having its cutting edge inclined upwardly from each of its ends.

References Cited in the file of this patent

UNITED STATES PATENTS

| | | |
|---|---|---|
| 364,948 | Moore | June 14, 1887 |
| 402,457 | Kennedy | Apr. 30, 1889 |
| 737,427 | Lemberg | Aug. 25, 1903 |
| 1,293,124 | Korte | Feb. 4, 1919 |
| 1,656,063 | Harrison | Jan. 10, 1928 |
| 1,812,797 | Lindemann | June 30, 1931 |
| 1,956,758 | Ernst | May 1, 1934 |
| 2,120,943 | Shutz | June 14, 1938 |
| 2,219,709 | Lee | Oct. 29, 1940 |
| 2,244,078 | Perlberg | June 3, 1941 |
| 2,362,701 | Koehring | Nov. 14, 1944 |
| 2,415,462 | Cherry et al. | Feb. 11, 1947 |
| 2,716,318 | Skromme | Aug. 30, 1955 |
| 2,758,649 | Anderson | Aug. 14, 1956 |
| 2,916,987 | Hanni | Dec. 15, 1959 |